United States Patent
Dai et al.

(10) Patent No.: US 10,044,039 B2
(45) Date of Patent: *Aug. 7, 2018

(54) NITROGEN-SULFUR-CARBON NANOCOMPOSITES AND THEIR APPLICATION AS CATHODE MATERIALS IN LITHIUM-SULFUR BATTERIES

(71) Applicant: UT-Battelle, LLC, Oak Ridge, TN (US)

(72) Inventors: Sheng Dai, Knoxville, TN (US); Xiao-Guang Sun, Knoxville, TN (US); Bingkun Guo, Knoxville, TN (US); Xiqing Wang, Mason, OH (US); Richard T. Mayes, Knoxville, TN (US); Teng Ben, Changchun (CN); Shilun Qiu, Changchun (CN)

(73) Assignee: UT-Batelle, LLC, Oak Ridge, TN (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/248,349

(22) Filed: Aug. 26, 2016

(65) Prior Publication Data
US 2016/0365581 A1   Dec. 15, 2016

Related U.S. Application Data

(63) Continuation of application No. 13/683,520, filed on Nov. 21, 2012, now Pat. No. 9,455,439.

(51) Int. Cl.
*H01M 4/60* (2006.01)
*H01M 4/137* (2010.01)
(Continued)

(52) U.S. Cl.
CPC .......... *H01M 4/602* (2013.01); *H01M 4/137* (2013.01); *H01M 4/38* (2013.01); *H01M 4/623* (2013.01);
(Continued)

(58) Field of Classification Search
CPC ............................. H01M 4/602; H01M 4/606
See application file for complete search history.

(56) References Cited

U.S. PATENT DOCUMENTS

| 7,517,612 B2 | 4/2009 | Ryu et al. |
| 8,129,543 B2 | 3/2012 | Kawada et al. |
| (Continued) | | |

FOREIGN PATENT DOCUMENTS

| CN | 101217073 | 7/2008 |
| JP | 2000-315527 | 11/2000 |
| (Continued) | | |

OTHER PUBLICATIONS

Machine Translation of JP 2011-146359 by Setoyama. (Year: 2011).*

(Continued)

*Primary Examiner* — Randy P Gulakowski
*Assistant Examiner* — Christina H Wales
(74) *Attorney, Agent, or Firm* — Scully Scott Murphy & Presser

(57) ABSTRACT

The invention is directed in a first aspect to electron-conducting porous compositions comprising an organic polymer matrix doped with nitrogen atoms and having elemental sulfur dispersed therein, particularly such compositions having an ordered framework structure. The invention is also directed to composites of such S/N-doped electron-conducting porous aromatic framework (PAF) compositions, or composites of an S/N-doped mesoporous carbon composition, which includes the S/N-doped composition in admixture with a binder, and optionally, conductive carbon. The invention is further directed to cathodes for a lithium-sulfur battery in which such composites are incorporated.

5 Claims, 8 Drawing Sheets

(51) Int. Cl.
H01M 4/62 (2006.01)
H01M 4/38 (2006.01)
H01M 10/0525 (2010.01)
B82Y 30/00 (2011.01)
H01M 4/02 (2006.01)

(52) U.S. Cl.
CPC ....... H01M 4/625 (2013.01); H01M 10/0525 (2013.01); *B82Y 30/00* (2013.01); *H01M 4/606* (2013.01); *H01M 2004/028* (2013.01); *Y02E 60/122* (2013.01)

(56) References Cited

U.S. PATENT DOCUMENTS

| | | | |
|---|---|---|---|
| 8,173,302 | B2 | 5/2012 | Stamm et al. |
| 8,252,461 | B2 | 8/2012 | Vu et al. |
| 2006/0024579 | A1* | 2/2006 | Kolosnitsyn ............ H01M 4/13 429/209 |
| 2010/0330432 | A1 | 12/2010 | Traulsen et al. |
| 2014/0255794 | A1 | 9/2014 | Zhang et al. |

FOREIGN PATENT DOCUMENTS

| | | |
|---|---|---|
| JP | 2011-146359 | 7/2011 |
| RU | 2 427 052 C1 | 8/2011 |
| WO | WO 2010/117219 A2 | 10/2010 |

OTHER PUBLICATIONS

Teng Ben, Kang Shi, Yan Cui, Cuiying Pei, Yang Zuo, Han Guo, Daliang Zhang, Jun Xu, Feng Deng, Zhongqun Tian and Shilun Qiu. Targeted synthesis of an electroactive organic framework (Year: 2011).*

Wang, J. et al., "A novel Conductive Polymer-Sulfur Composite Cathode Material for Rechargeable Lithium Batteries", Adv. Mater. (2002), vol. 14, pp. 963-965.

Fu, Y. et al., "Sulfur-Polypyrrole Composite Cathes for Lithium-Sulfur Batteries", Journal of the Electrochemical Society, (Aug. 14, 2012),vol. 159, No. 9, pp. A1420-A1424.

Ben, T. et al., "Targeted synthesis of an electroactive organic framework", J Mater Chem, (2011), vol. 21, pp. 18208-18214.

Datta K.K.R. et al., "Highly Crystalline and Conductive Nitrogen-Doped Mesoporous Carbon With Graphitic Walls and its Electrochemical Performance", Chemistry A European Journal 17:3390-3397 (2011).

Guo B. et al., "Soft-Templated Mesoporous Carbon-Carbon Nanotube Composites for High Performance Lithium-Ion Batteries" Advanced Materials 23:4661-4666 (2011).

Kichambare P. et al., "Electrochemical Performance of Highly Mesoporous Nitrogen Doped Carbon Cathode in Lithium-Oxygen Batteries", Journal of Power Sources 196:3310-3316 (2011).

Liu H. et al., "Mesoporous $TiO_2$-B Microspheres With Superior Rate Performance for Lithium Ion Batteries", Advanced Materials 23:3450-3454 (2011).

Bogdanov M.G. et al., "New Guanidinium-Based Room-Temperature Ionic Liquids. Substituent and Anion Effect on Density and Solubility in Water", Z. Naturforsch 65b:37-48 (2010).

Shao Y. et al., "Nitrogen-Doped Mesoporous Carbon for Energy Storage in Vanadium Redox Flow Batteries", Journal of Power Sources 195:4375-4379 (2010).

Sun X.G. et al., "Electrochemical Investigations of Ionic Liquids With Vinylene Carbonate for Applications in Rechargeable Lithium Ion Batteries", Electrochimica Acta 55:4618-4626 (2010).

Sun X.G. et al., "Rechargeable Lithium/Sulfur Batteries Based on Nitrogen-Doped Mesoporous Carbon and Ionic Liquid Electrolytes", The 15th International Meeting on Lithium Batteries (Jun. 27-Jul. 2, 2010), abstract.

Armand M. et al., "Ionic-Liquid Materials for the Electrochemical Challenges of the Future", Nature Materials 8:621-629 (Aug. 2009).

Ji X. et al., "A Highly Ordered Nanostructured Carbon-Sulphur Cathode for Lithium-Sulphur Batteries", Nature Materials 8:500-506 (Jun. 2009).

Lai C. et al., "Synthesis and Electrochemical Performance of Sulfur/Highly Porous Carbon Composites", J. Phys. Chem. C 113(11):4712-4716 (2009).

Liang C. et al., "Hierarchically Structured Sulfur/Carbon Nanocomposite Material fro High-Energy Lithium Battery", Chem. Mater. 21(19):4724-2730 (2009).

Choi J.W. et al., "Rechargeable Lithium/Sulfur Battery With Liquid Electrolytes Containing Toluene as Additive", Journal of Power Sources 183:441-445 (2008).

Greaves T.L. et al., "Protic Ionic Liquids: Properties and Applications", Chem. Rev. 108(1):206-237 (2008).

Shin J.H. et al., "N-Methyl-(n-Butyl)Pyrrolidinium Bis(Trifluoromethanesulfonyl)Imide-LiTFSI-Poly(Ethylene Glycol) Dimethyl Ether Mixture as a Li/S Cell Electrolyte", Journal of Power Sources 177:537-545 (2008).

Sun J. et al., "Application of Gelatin as a Binder for the Sulfur Cathode in Lithium-Sulfur Batteries", Electrochimica Acta 53:7084-7088 (2008).

Sun J. et al., "Preparation and Electrochemical Characterization of the Porous Sulfur Cathode Using a Gelatin Binder", Electrochemistry Communications 10:930-933 (2008).

Wang J. et al., "Sulfur-Mesoporous Carbon Composites in Conjunction With a Novel Ionic Liquid Electrolyte for Lithium Rechargeable Batteries", Carbon 46:229-235 (2008).

Choi J.W. et al., "Rechargeable Lithium/Sulfur Battery With Suitable Mixed Liquid Electrolytes", Electrochimica Acta 52:2075-2082 (2007).

Jung Y. et al., "New Approaches to Improve Cycle Life Characteristics of Lithium-Sulfur Cells", Electrochemistry Communications 9:249-254 (2007).

Liang C. et al., "Synthesis of Mesoporous Carbon Materials via Enhanced Hydrogen-Bonding Interaction", J. Am. Chem. Soc. 128(16):5316-5317 (2006).

Yuan L.X. et al., "Improved Dischargeability and Reversibility of Sulfur Cathode in a Novel Ionic Liquid Electrolyte", Electrochemistry Communications 8:610-614 (2006).

Zhu X. et al., "Electrochemical Characterization and Performance Improvement of Lithium/Sulfur Polymer Batteries", Journal of Power Sources 139:269-273 (2005).

Song M.S. et al., "Effects of Nanosized Adsorbing Material on Electrochemical Properties of Sulfur Cathodes for Li/S Secondary Batteries", Journal of the Electrochemical Society 151(6):A791-A795 (2004).

Hayashi A. et al., "All-Solid-State Li/S Batteries With Highly Conductive Glass-Ceramic Electrolytes", Electrochemistry Communications 5:701-705 (2003).

Jeon B.H. et al., "Preparation and Electrochemical Properties of Lithium-Sulfur Polymer Batteries", Journal of Power Sources 109:89-97 (2002).

International Search Report and Written Opinion dated Feb. 20, 2014 received from related Application No. PCT/US2013/070948.

* cited by examiner

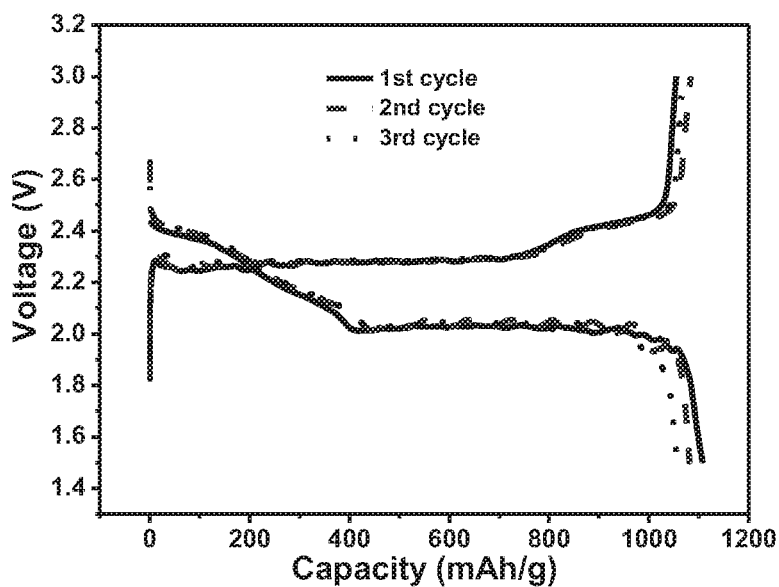
(FIG. 2A)
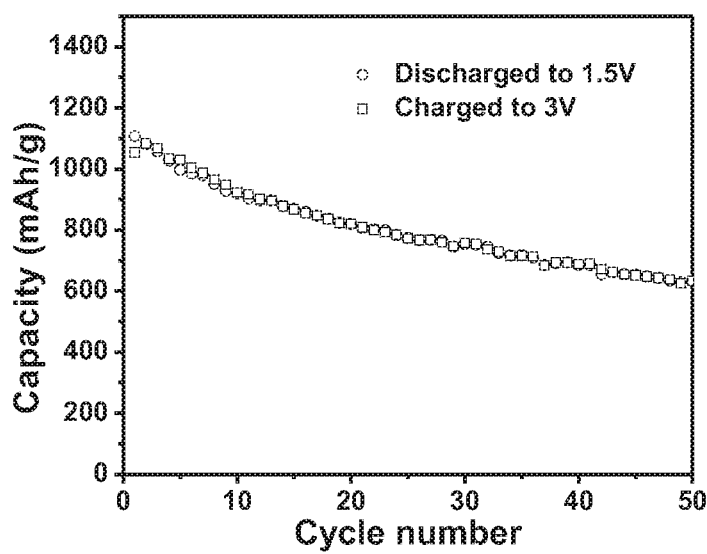
(FIG. 2B)

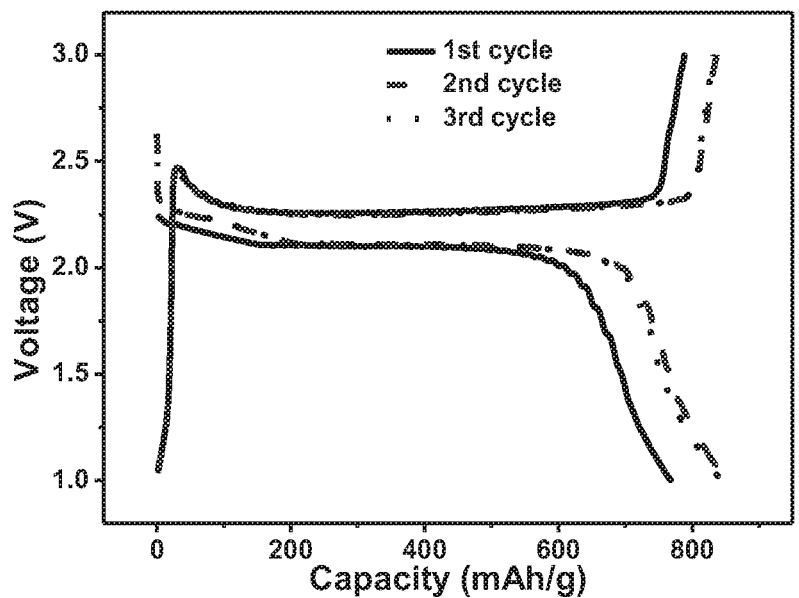
(FIG. 3A)
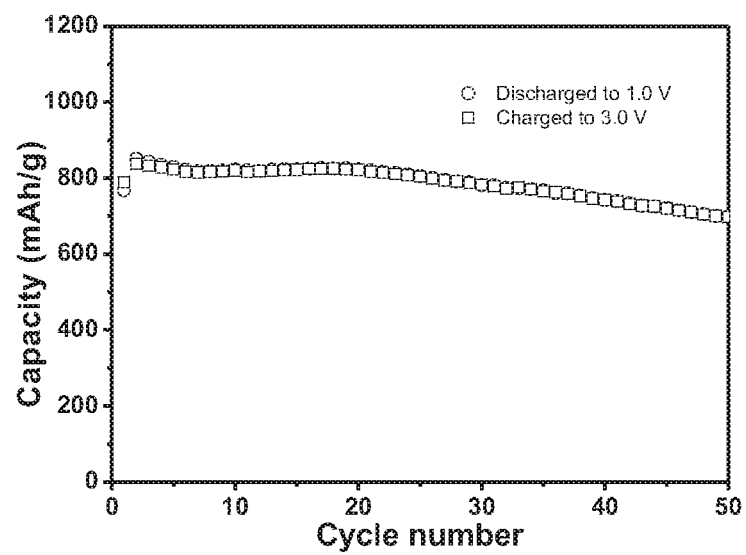
(FIG. 3B)

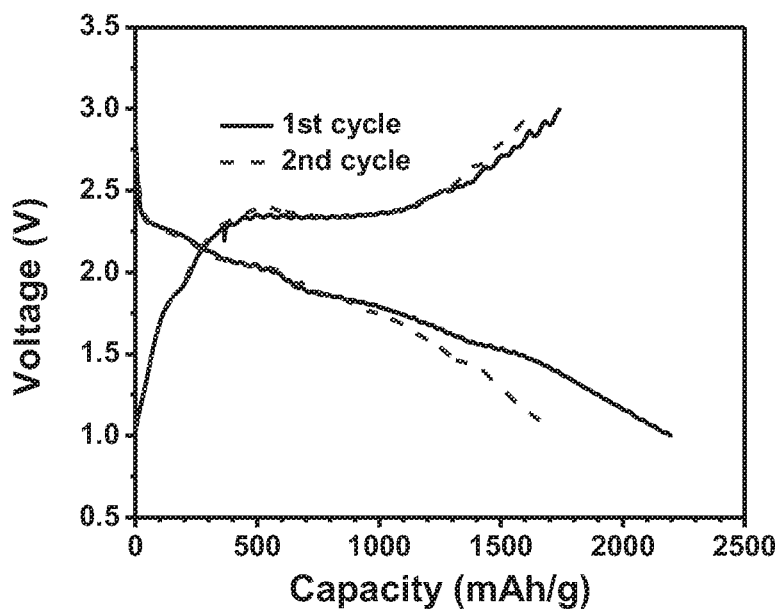
(FIG. 5A)
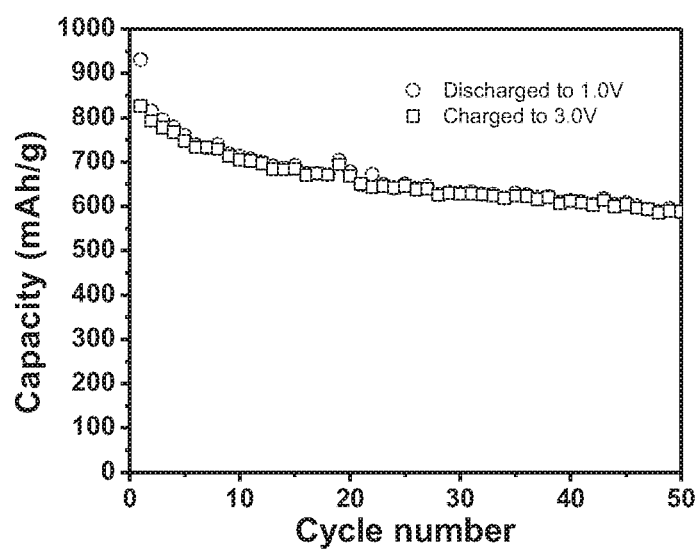
(FIG. 5B)

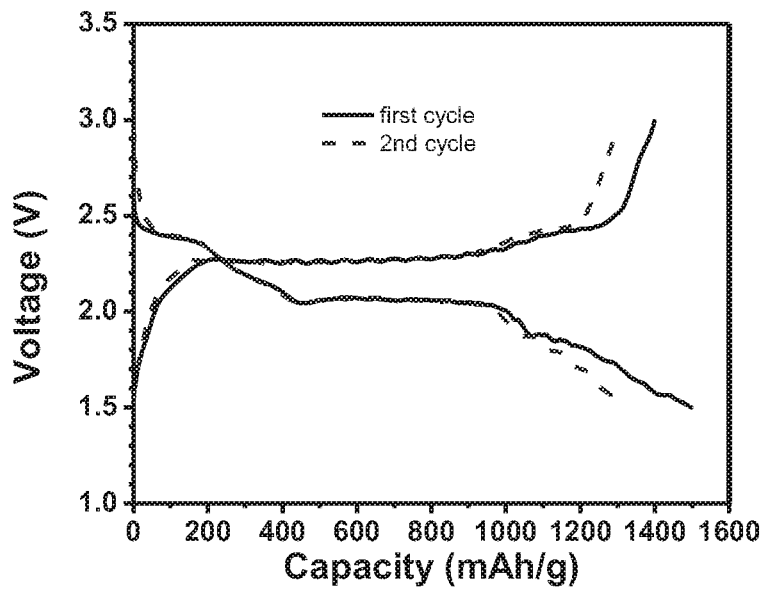
(FIG. 7A)
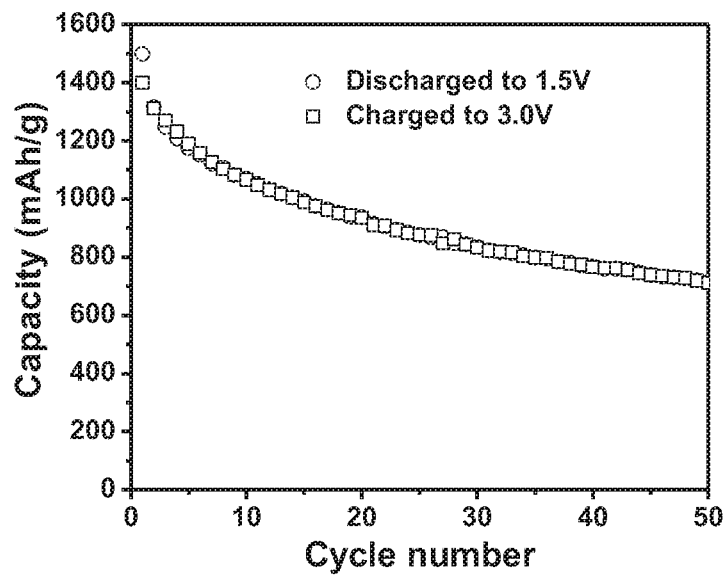
(FIG. 7B)

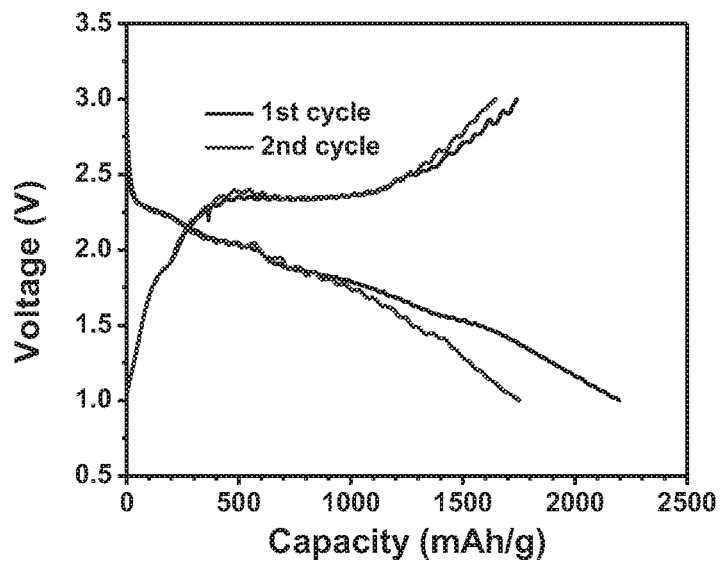
(FIG. 8A)
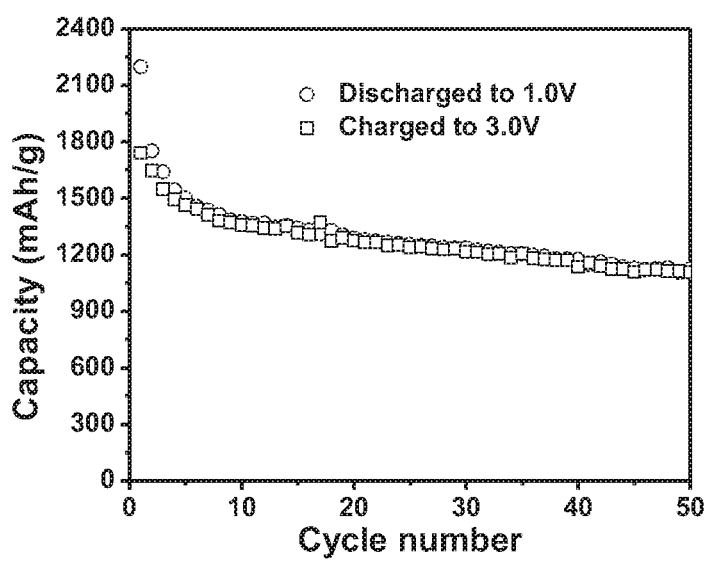
(FIG. 8B)

NITROGEN-SULFUR-CARBON NANOCOMPOSITES AND THEIR APPLICATION AS CATHODE MATERIALS IN LITHIUM-SULFUR BATTERIES

The present application is a continuation of copending U.S. application Ser. No. 13/683,520 filed Nov. 21, 2012, the contents of which are incorporated herein by reference in their entirety.

This invention was made with government support under Prime Contract No. DE-AC05-00OR22725 awarded by the U.S. Department of Energy. The government has certain rights in the invention.

FIELD OF THE INVENTION

The present invention relates generally to cathode materials for lithium ion batteries, and more particularly, cathode materials for lithium-sulfur batteries.

BACKGROUND OF THE INVENTION

Lithium-ion batteries have found widespread usage as electrical energy storage devices in various portable electronics because of their light weight relative to other types of batteries. However, particularly for high power applications such as electric vehicles, there has been a continuing effort to improve the energy output and useful lifetime in lithium ion batteries to better suit these high power applications.

Lithium-sulfur (Li/S) batteries, in particular, hold great promise for high power applications. Lithium-sulfur batteries have a theoretical capacity of 1675 mAhg$^{-1}$, nearly one magnitude higher than that of LiFePO$_4$ (theoretical capacity of 176 mAhg$^{-1}$). Nevertheless, the Li/S system has not yet been implemented in high power applications because of two significant obstacles: the poor electrical conductivity of elemental sulfur and the intrinsic polysulfide shuttle, both of which contribute to capacity fade with cycling.

The electrical conductivity of elemental sulfur is as low as 5×10$^{-30}$ S/cm at 25° C. Such a low conductivity causes poor electrochemical contact of the sulfur and leads to low utilization of active materials in the cathode. Although compositing elemental sulfur with carbon or conducting polymers significantly improves the electrical conductivity of sulfur-containing cathodes, the porous structure of the cathode still needs optimization to facilitate the transport of ions while retaining the integrity of the cathode after dissolution of sulfur at the discharge cycle.

The sulfur in the cathode, except at the full charge state, is generally present as a solution of polysulfides in the electrolyte. The concentration of polysulfide species $S_n^{2-}$ with n greater than 4 at the cathode is generally higher than that at the anode, and the concentration of $S_n^{2-}$ with n smaller than 4 is generally higher at the anode than the cathode. The concentration gradients of the polysulfide species drive the intrinsic polysulfide shuttle between the electrodes, and this leads to poor cyclability, high current leakage, and low charge-discharge efficiency.

Most importantly, a portion of the polysulfide is transformed into lithium sulfide, which is deposited on the anode. This deposition process occurs in each charge/discharge cycle and eventually leads to the complete loss of capacity of the sulfur cathode. The deposition of lithium sulfide also leads to an increase of internal cell resistance due to the insulating nature of lithium sulfide. Progressive increases in charging voltage and decreases in discharge voltage are common phenomena in lithium-sulfur batteries because of the increase of cell resistance in consecutive cycles. Hence, the energy efficiency decreases with the increase of cycle numbers.

Much research has been conducted to mitigate the negative effect of the polysulfide shuttle. The bulk of this research has focused on either the protection of lithium anode or the restraining of the ionic mobility of the polysulfide anions. However, protection of the lithium anode leads to the passivation of the anode, and this in turn causes a slow reaction rate of the anode during the discharge cycle. Therefore, protection of the lithium anode leads to the loss of power density. Gel electrolytes and solid electrolytes have also been used as a means for slowing down the polysulfide shuttle by reducing the ionic mobility of electrolytes. However, the slow transport of ions leads to a low power density. Moreover, neither the protection of lithium anode nor the restraining of ionic mobility completely shuts down the polysulfide shuttle. Although the polysulfide shuttle occurs at slow speed, such modified Li/S batteries generally suffer from a significantly shortened lifespan as compared to lithium ion batteries without these modifications.

Accordingly, there is a need for lithium-sulfur batteries with improved performance, particularly with respect to initial discharge capacities, cycling performance, rate capability, and electrical power output (i.e., improved power density), as well as improved usable lifetime. There would be a particular benefit in a lithium-sulfur battery possessing both an improved power output and an improved usable lifetime. In achieving the aforementioned goals, there is a particular need for a lithium-sulfur battery design that minimizes or altogether prevents the irreversible deposition of lithium sulfide on the lithium anode of the battery.

SUMMARY OF THE INVENTION

In one aspect, the invention is directed to new composite materials useful as cathodic materials for a lithium-sulfur battery. Special design features have been incorporated into the composite material that permits the composite material to substantially minimize the formation of lithium sulfide at the anode and to improve initial discharge capacities, cycling performance, rate capabilities, and usable lifetime.

In a first set of embodiments, the composite material includes a novel electron-conducting porous composition composed of an organic polymer matrix doped with nitrogen atoms and having elemental sulfur dispersed therein. For example, the electron-conducting porous composition can be composed of an ordered framework structure in which nitrogen atoms are interconnected by unsaturated hydrocarbon linkers, wherein the ordered framework structure contains micropores in which sulfur is incorporated. In a second set of embodiments, the composite material includes a mesoporous carbon composition doped with nitrogen atoms and having elemental sulfur dispersed therein.

The composite typically also includes an amount of conductive carbon (e.g., 10-30 wt % by weight of the composite) and a binder, such as PVDF. In particular embodiments, the conductive carbon is carbon black. In other particular embodiments, the conductive carbon is or includes carbon nanotubes.

In another aspect, the invention is directed to a lithium-sulfur battery containing a cathode that contains any of the above nitrogen-sulfur-carbon composite materials. The lithium-sulfur battery can employ a liquid, solid, or gel electrolyte that includes a lithium salt. In particular embodiments, the lithium-sulfur battery employs an ionic liquid electrolyte. The ionic liquid can be, for example, a pyrrolidinium or piperidinium ionic liquid.

In other aspects, the invention is directed to a method of operating a lithium-sulfur battery that includes any of the cathode composite materials and/or electrolytes (particularly ionic liquids) described herein. The invention is also directed to methods of preparing the cathode composite materials as well as methods for assembling lithium sulfur batteries that include these cathode composite materials.

BRIEF DESCRIPTION OF THE DRAWINGS

FIGS. 3A, 3B. Graphs showing charge/discharge profile (FIG. 3A) and cycle performance (FIG. 3B) of Li—S batteries based on PAF-S composite electrodes in 0.5 M LiTFSI/MPPY.TFSI at a current density of 84 mA g$^{-1}$ (20 wt % carbon) at 50° C.

FIGS. 5A, 5B. Graphs showing charge/discharge profile (FIG. 5A) and cycle performance (FIG. 5B) of Li—S batteries based on S/N-doped mesoporous carbon composite electrodes in 0.5 M LiTFSI/MPPY.TFSI at a current density of 84 mA g$^{-1}$ (20 wt % carbon) at 50° C.

FIGS. 7A, 7B. Graphs showing charge/discharge profile (FIG. 7A) and cycle performance (FIG. 7B) of Li—S batteries based on CNT-mesoporous carbon composite electrodes in 1.0 M LiPF$_6$/MiPS at a current density of 84 mA g$^{-1}$ (20 wt % carbon) at room temperature.

FIGS. 8A, 8B. Graphs showing charge/discharge profile (FIG. 8A) and cycle performance (FIG. 8B) of Li—S batteries based on CNT-mesoporous carbon composite electrodes in 0.5 M LiTFSI/MPPY.TFSI at a current density of 84 mA g$^{-1}$ (20 wt % carbon) at room temperature.

DETAILED DESCRIPTION OF THE INVENTION

Figure 1:
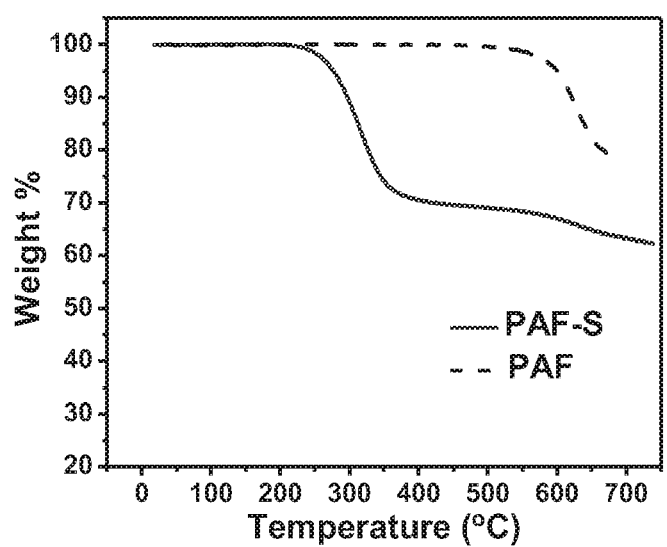
FIG. 1. Graph showing thermogravimetric analysis (TGA) trace for PAF (porous aromatic framework) and its sulfur-doped version PAF-S FIGS. 2A, 2B. Graphs showing charge/discharge profile (FIG. 2A) and cycle performance (FIG. 2B) of Li—S batteries based on PAF-S composite electrodes in 1.0 M LiPF$_6$/MiPS at a current density of 84 mA g$^{-1}$ (20 wt % carbon) at room temperature.

As used herein, the term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. In addition, the term "about" can indicate either a measurement error (i.e., by limitations in the measurement method), or alternatively, a variation or average in a physical characteristic of a group (e.g., a population of pores).

In a first aspect, the invention is directed to an electron-conducting (i.e., conductive) porous composition containing an organic polymer matrix doped with nitrogen atoms and having elemental sulfur disposed therein. The term "electron-conducting" or "conductive", as used herein, includes any degree of conductivity, including semiconducting, conducting, or superconducting. The term "organic", as used herein, is defined as a composition that includes carbon atoms, and more typically, carbon atoms engaged in carbon-carbon single, double, and/or triple bonds. The organic polymer matrix is typically unsaturated (i.e., by containing carbon-carbon double or triple bonds) in order to permit electron conduction. Generally, the unsaturated bonds are conjugated (i.e., delocalized) to permit electron conduction. In particular embodiments, the nitrogen-doped conductive polymer includes aromatic groups (for example, phenyl) and/or aromatic linkages (e.g., phenylene). The nitrogen-doped organic polymer matrix can be, for example, a polypyrrole, polyaniline, polyimine (e.g., aromatic polyimine), or nitrogen-doped poly(p-phenylene vinylene) conductive polymer.

In particular embodiments, the electron-conducting porous composition is or includes an ordered framework structure in which nitrogen atoms are interconnected by unsaturated hydrocarbon linkers. The hydrocarbon linkers can be any hydrocarbon linker known in the art, typically unsaturated, such as vinylene, o-, m-, or p-phenylene, p-biphenylene, p-terphenylene, 4,4'-stilbene, and 1,5-naphthalene. The term "framework structure", as used herein, denotes a structural order either in one, two, or three dimensions, analogous in some respects to the order found in metal-organic frameworks (MOFs). The framework structure may have crystalline attributes or may be altogether crystalline or semi-crystalline. In other embodiments, the framework is non-crystalline (i.e., amorphous) but has an ordered pore size or ordered pore size distribution. The ordered nature of the framework material preferably possesses a substantially uniform pore size distribution.

The electron-conducting porous composition can have any suitable pore size and pore size distribution. The pores can be, for example, micropores, mesopores, or macropores, or a combination thereof. The term "micropores", as used herein and as commonly understood in the art, refer to pores having a size of less than 2 nm. In different embodiments, the micropores can have a size of precisely, about, at least, up to, or less than, for example, 0.5, 0.8, 1, 1.2, 1.5, 1.8, or 2 nm, or a pore size within a range bounded by any two of the foregoing exemplary values. The term "mesopores", as used herein and as commonly understood in the art, refers to pore sizes of 2 to 50 nm. In different embodiments, the mesopores can have a size of precisely, about, at least, above, up to, or less than, for example, 2, 3, 4, 5, 8, 10, 12, 15, 18, 20, 25, 30, 35, 40, 45, or 50 nm, or a pore size within a range bounded by any two of the foregoing exemplary values. The term "macropores", as used herein and as commonly understood in the art, refers to pore sizes above 50 nm. In different embodiments, the macropores can have a size of precisely, about, at least, above, up to, or less than, for example, 50, 60, 70, 80, 90, 100, 150, 200, or 250 nm, or a pore size within a range bounded by any two of the foregoing exemplary values. In some embodiments, the electron-conducting porous composition possesses only micropores, or only mesopores, or only macropores. In other embodiments, the electron-conducting porous composition possesses a proportion of pores as micropores and mesopores, or micropores and macropores, or mesopores and macropores, or micropores, mesopores, and macropores. Generally, micropores and mesopores have a circular shape, which can be an approximately circular (e.g., ellipsoidal) or completely circular shape. For pores having a circular shape, the pore size refers either to the surface diameter of the pore (in the case of a completely circular pore) or the longest surface diameter of the pore (in the case of an elliptical pore). The pores can also be non-circular, or even irregular-shaped.

The pores can also possess a degree of uniformity. The uniformity can be in any desired property, such as the pore diameter (pore size), wall thickness, or inter-pore spacing. Typically, by being substantially uniform is meant that the pores show no more than 15% or 10%, and more preferably, no more than 5%, 2%, 1%, 0.5%, or 0.1% deviation (i.e., absolute or standard deviation) in one or more attributes of the pores, particularly pore size. In a particular embodiment, the pores possess an ordered spatial arrangement with each other. In some embodiments, the ordered arrangement includes a patterned or symmetrical spatial arrangement of the pores. The patterned spatial arrangement can be, for example, a hexagonal close packed or cubic arrangement. The pore size distribution may also be characterized as monomodal, bimodal, trimodal, or a higher modality.

The electron-conducting porous composition can have any suitable total pore volume. For example, in different embodiments, the total pore volume can be at least 0.5, 1, 1.5, 2, 2.2, or 2.5 $cm^3/g$, or a pore volume within a range bounded by any two of these values.

The electron-conducting porous composition can have any suitable wall thickness of the pores. For example, in different embodiments, the wall thickness can be about, at least, or less than 1 nm, 2 nm, 3 nm, 4 nm, 5 nm, 6 nm, 7 nm, 8 nm, 9 nm, 10 nm, 11 nm, 12 nm, 15 nm, 18 nm, 20 nm, 25 nm, or 30 nm, or within a range bounded by any two of these values.

The electron-conducting porous composition can also have any suitable surface area. For example, in different embodiments, the surface area can be at least 300 $m^2/g$, 400 $m^2/g$, 500 $m^2/g$, 600 $m^2/g$, 700 $m^2/g$, 800 $m^2/g$, 900 $m^2/g$, 1000 $m^2/g$, 1200 $m^2/g$, 1500 $m^2/g$, 1800 $m^2/g$, 2000 $m^2/g$, 2500 $m^2/g$, 3000 $m^2/g$, 3500 $m^2/g$, 4000 $m^2/g$, 4500 $m^2/g$, or 5000 $m^2/g$, or a surface area within a range bounded by any two of these values.

In the electron-conducting porous composition, sulfur is incorporated either within the matrix, the pores, or both. The sulfur can be in the form of, for example, elemental sulfur (S), sulfide ($S^{2-}$), or a polysulfide ($S_n^{2-}$, wherein n is a number greater than 1, and up to, for example, 2, 3, 4, 5, 6, 7, 8, 9, or 10). At least a portion of the pores is occupied by (i.e., "filled with" or "contains") elemental sulfur. The portion of pores occupied by elemental sulfur can be about, at least, above, up to, or less than, for example, 1, 2, 5, 10, 20, 30, 40, 50, 60, 70, 80, 90, 95, 98, 99, or 100 volume % (vol %) of the pores.

The amount of sulfur contained in the sulfur-carbon composite (i.e., the "sulfur loading" in terms of weight percentage (wt %) of sulfur by total weight of the sulfur-carbon composite) generally depends on the total pore volume of the composite material. Accordingly, the sulfur loading can be adjusted by suitable adjustment of the total pore volume. As the total pore volume increases, higher sulfur loadings are made possible. Thus, by suitable adjustment of the pore volume, a sulfur loading of about, at least, above, up to, or less than, for example, 5, 10, 15, 20, 25, 30, 35, 40, 45, or 50 wt % by weight of the electron-conducting porous composition can be attained.

In some embodiments, the electron-conducting porous composition further includes one or more dopants that facilitate or cause the composition to be conducting or semi-conducting. Some examples of such dopants include acids (i.e., inorganic or organic acids), bases (inorganic or organic bases), and oxidants, such as halogens (e.g., chlorine, bromine, or iodine). In some embodiments, one or more (or all) of such dopants are excluded.

In particular embodiments, the electron-conducting porous composition contains interconnected triphenylamine units. A particular example of such an electron-conducting porous composition (i.e., PAF) is described in T. Ben, et al., *J. Mater. Chem.*, 21, 18208 (2011), the disclosure of which is herein incorporated by reference in its entirety. PAF is microporous with a uniform micropore distribution centered at about 1.2 nm.

In other particular embodiments, the electron-conducting porous composition is a mesoporous carbon composition, such as any of the mesoporous carbon compositions known in the art, that has been modified to include nitrogen and sulfur. The mesoporous carbon composition before such modification can be, for example, as described in C. Liang, et al., *J. Am. Chem. Soc.*, 128, pp. 5316-5317 (2006) or C. Liang, et al., *Chem. Mater.*, 21, pp. 4724-4730 (2009), the disclosures of which are herein incorporated by reference in their entirety.

The electron-conducting porous composition can be prepared by any suitable method. In one set of embodiments, the electron-conducting porous composition is prepared by treating an N-doped porous carbon template with sulfur under elevated temperature conditions effective for incorporating the sulfur into the carbon matrix. In other embodiments, the electron-conducting porous composition is prepared by treating a porous carbon template with both nitrogen (e.g., ammonia) and elemental sulfur, typically as separate steps, in a process where nitrogen and sulfur become incorporated into the carbon matrix. In yet other embodiments, the electron-conducting porous composition is prepared by carbonizing a precursor that contains a carbonizable matrix, nitrogen, and sulfur. Volatile agents can be included in the precursor to produce a porous structure during carbonization.

In some embodiments, the electron-conducting porous composition is not carbonized, and thus, does not have a carbon matrix; instead, the composition contains organic linking groups to nitrogen with sulfur incorporated into pores therein. For example, in one set of embodiments, an electron-conducting N-doped porous framework composition, such as PAF, described above, is heated with sulfur, below a carbonization temperature, in order to incorporate sulfur therein.

In some embodiments, the method includes impregnating a porous nitrogen-doped carbon component, having the characteristics described above, and as prepared by methods known in the art, with a solution of elemental sulfur. The elemental sulfur considered herein can be any allotropic form of sulfur. The elemental sulfur considered herein typically consists predominantly of crown-shaped $S_8$ molecules. However, numerous other forms and allotropes of sulfur are known, all of which are considered herein. For example, by appropriate processing conditions, elemental sulfur containing $S_6$, $S_7$, $S_9$, $S_{10}$, $S_{11}$, $S_{12}$, or up to $S_{18}$ rings, or linear or branched forms, can be formed. In addition, the sulfur can be crystalline (e.g., of a rhombic or monoclinic space group) or amorphous. The elemental sulfur is dissolved in a solvent to form the solution of elemental sulfur. The solvent is any solvent capable of dissolving elemental sulfur to the extent that a solution of, preferably, at least 1 wt % (and more preferably, 2, 5, 10, 15, or 20 wt %) sulfur is obtained. Some examples of such solvents include benzene, toluene, and carbon disulfide.

The driving force that determines the order in which pores are filled is the adsorption energy, which increases with decreasing pore size. Due to the higher adsorption energy of the micropores as compared to the mesopores, the impregnation step generally first impregnates the micropores with sulfur before the mesopores become impregnated with sulfur. Once the micropores are filled, the small mesopores (i.e., of about 3 or 4 microns) will start to fill. Application of a heating (i.e., annealing) step after the impregnation step can further ensure that the micropores are filled first.

After the bimodal porous carbon component (i.e., "carbon" or "carbon material") has been impregnated with sulfur, the solvent is substantially removed from the sulfur-impregnated carbon (i.e., the sulfur-impregnated carbon is dried). By being "substantially removed" is meant that at least 80%, and more preferably, at least 90%, 95%, or 98% of the solvent is removed. Any method of drying can be used, including, for example, air-drying at ambient temperature (e.g., 15-30° C.), application of a vacuum, and/or heating, e.g., for a suitable period of time at a temperature of at least 30° C., but no more than 40° C., 50° C., 60° C., 70° C., 80° C., 90° C., or 100° C. After the drying step is complete, if desired, another impregnation step can be applied to the dried sulfur-impregnated carbon, followed by another drying step. Any number of impregnation-drying cycles can be applied to the carbon material depending on the loading of sulfur desired; i.e., as the number of impregnation-drying cycles applied to the carbon material is increased, the sulfur loading increases. By knowing the concentration of the sulfur solution and the amount (i.e., mass or volume, as appropriate) of the solution used in each impregnation step, the amount of sulfur impregnated in the carbon material can be calculated by multiplying the concentration of the solution and the amount of the solution used. By weighing the carbon material before impregnation with sulfur, the amount of sulfur needed to achieve a particular sulfur loading can also be known.

The impregnation and drying process can be followed by an annealing process (i.e., a post-annealing step). Alternatively, the drying step described above can be omitted, and the impregnation step followed directly by an annealing process. The drying process may also be replaced by an annealing process such that one or more impregnation-annealing cycles are applied to the porous carbon material. An annealing process is useful to remove residual amounts of solvents in the sulfur-impregnated carbon material. The annealing process can also be beneficial for filling the pores because sulfur preferably melts at the annealing temperature. The annealing process is preferably conducted at a temperature above 100° C., and more preferably at least at the melting point of sulfur (e.g., at least 115° C.), and below the boiling point of the elemental sulfur used, and more preferably, no more than 400° C. For example, in different embodiments, an annealing temperature of about 110° C., 120° C., 130° C., 140° C., 150° C., 160° C., 170° C., 180° C., 190° C., 200° C., 250° C., 300° C., 350° C., or 400° C. is used. Alternatively, the annealing temperature can be within a range bounded by any two of these values. Preferably, the annealing process is conducted under an inert atmosphere environment. Some examples of suitable inert gases include nitrogen and argon.

In particular embodiments, the electron-conducting porous composition is in a suitable form and shape to be incorporated into or function as a cathode for a lithium-sulfur battery. For purposes of functioning as a cathode material in a lithium battery, the electron-conducting porous composition can be shaped as a film, coating, or layer. The film, coating, or layer can have any desirable thickness, such as a thickness of 1, 2, 5, 10, 15, 20, 25, 50, 100, 200, 250, 500, 750, or 1 mm, or a thickness within a particular range bounded by any two of the foregoing values.

The electron-conducting porous composition described above can be shaped by any of the methods known in the art, such as by pressing under a specified load to form a desired shape, such as a disc. In conventional practice, the electron-conducting porous composition is combined with a binder to form a cathode composite (i.e., "composite") with better shaping qualities. The binder can be any of the binders known in the art, such as the fluoropolymer binders, of which polyvinylidene difluoride (PVDF) is a prime example. The binder can be incorporated into the composite in any suitable amount, such as an amount of about, at least, above, up to, or less than, for example, 1, 2, 5, 10, 12, 15, 20, 25, or 30 wt % by weight of the composite.

The electron-conducting porous composition can be included in the cathode composite in any suitable amount. In different embodiments, the electron-conducting porous composition can be included in the composite in an amount of about, at least, above, up to, or less than, for example, 5, 10, 12, 15, 20, 25, 30, 35, 40, 45, 50, 55, 60, 65, 70, 75, 80, 85, 90, 95, 98, or 100 wt % by weight of the composite, or an amount within a range bounded by any two of the foregoing values.

The composite may also include a desired amount of a conductive carbon material. The conductive carbon can be any such materials known in the art, such as a conductive carbon black, graphite, glassy carbon, or a fullerene, such as a carbon nanotube or spherical fullerene, such as buckminsterfullerene ($C_{60}$). In embodiments where carbon nanotubes are included, the carbon nanotubes can be any of the carbon nanotubes known in the art, including single-walled carbon nanotubes (SWNTs) or multi-walled carbon nanotubes (MWNTs). In different embodiments, the conductive carbon can be included in the composite in an amount of about, at least, above, up to, or less than, for example, 1, 2, 5, 10, 15, 20, 25, 30, 35, 40, 45, 50, 55, 60, 65, 70, 75, or 80 wt % by weight of the composite, or an amount within a range bounded by any two of the foregoing values.

In another aspect, the invention is directed to a layer structure that includes a current collector material having coated thereon a layer of the nitrogen-sulfur-carbon composite material described above. The layer of composite material can have any suitable thickness, including any of the exemplary thicknesses described above. The current collector material can be any conductive material with physical characteristics suitable for use in lithium-sulfur batteries. Some examples of suitable current collector materials include aluminum, nickel, cobalt, copper, zinc, conductive carbon forms, and alloys thereof. The current collector can be of any suitable shape and have any suitable surface morphology, including microstructural or nanostructural characteristics.

In another aspect, the invention is directed to a lithium-sulfur battery (i.e., "lithium ion battery" or "battery") that contains the above-described nitrogen-sulfur-carbon composite material as a cathode component. The lithium-sulfur battery of the invention preferably possesses the characteristic of being able to operate for at least 50, 60, 70, 80, 90, 100, 110, 120, 130, 140, 150, 160, 170, 180, 190, 200, 210, 220, 230, 240, or 250 cycles while maintaining a specific discharge capacity (i.e., "discharge capacity" or "capacity") of at least 350, 400, 450, 500, 600, 700, 800, 900, 1000, 1100, 1200, 1300, 1400, or 1500 mA-hr/g.

As known in the art, the lithium-sulfur battery necessarily includes at least a lithium anode (typically, a foil of lithium or lithium alloy), a cathode (which in this case includes the nitrogen-sulfur-doped electron-conducting porous composition described above), separator, and a battery shell. The battery also typically includes current collecting plates (e.g., Cu or Al foil) for both anode and cathode. During operation, the battery includes a lithium-containing electrolyte medium in contact with the anode and cathode. The lithium-sulfur battery may contain any of the components typically found in a lithium-sulfur battery, such as described in, for example, U.S. Pat. Nos. 7,517,612 and 8,252,461, the contents of which are incorporated herein by reference in their entirety. To improve conductivity at the cathode, conductive carbon material (e.g., carbon black, carbon fiber, or graphite) is typically included in the cathode material. The cathode material is typically admixed with an adhesive (e.g., PVDF, PTFE, and co-polymers thereof) in order to be properly molded as an electrode. In some embodiments, the cathode material may or may not also include a metal oxide, such as ZnO, CuO, SnO, or $Mn_2O_3$.

In one embodiment, the lithium-containing electrolyte medium is a liquid. In another embodiment, the lithium-containing electrolyte medium is a solid. In yet another embodiment, the lithium-containing electrolyte medium is a gel.

Preferably, the electrolyte medium includes a matrix material within which is incorporated one or more lithium ion electrolytes. The lithium ion electrolyte can be any lithium ion electrolyte, and particularly, any of the lithium ion electrolytes known in the art.

In one embodiment, the lithium ion electrolyte (lithium salt) is non-carbon-containing (i.e., inorganic). For example, the lithium ion electrolyte can be a lithium ion salt of such counteranions as the halides (e.g., chloride, bromide, or iodide), hexachlorophosphate ($PCl_6^-$), hexafluorophosphate ($PF_6^-$), perchlorate, chlorate, chlorite, perbromate, bromate, bromite, periodiate, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates.

In another embodiment, the lithium ion electrolyte is carbon-containing (i.e., organic). The organic counteranion may, in one embodiment, lack fluorine atoms. For example, the lithium ion electrolyte can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium ion electrolyte can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonimides (e.g., $(CF_3SO_2)_2N^-$).

In some embodiments, any one or more classes or specific types of lithium salts are excluded from the electrolyte. In other embodiments, a combination of two or more lithium salts are included in the electrolyte.

The lithium ion electrolyte is incorporated in the electrolyte medium preferably in an amount which imparts a suitable concentration of lithium ions and suitable level of conductivity to the electrolyte medium. The conductivity of the electrolyte medium can be, for example, at least 0.01 mS/cm (0.001 S/m) at an operating temperature of interest, and particularly at a temperature within 20-60° C. In different embodiments, the lithium ion electrolyte is present in the electrolyte in a concentration of precisely, about, at least, above, up to, or less than, for example, 0.1, 0.5, 1.0, 1.2, 1.5, 1.8, 2, 2.5, or 3 M, where "M" indicates a molarity concentration.

In some embodiments, the electrolyte medium further includes one or more halide-containing additives (i.e., "halide additives"). The halide additive can be any halide-containing ionic compound or material (i.e., a salt). The halide considered herein can be, for example, fluoride ($F^-$), chloride ($Cl^-$), bromide ($Br^-$), or iodide ($I^-$), or a combination thereof. The countercation can be any inorganic or organic countercation. The inorganic countercation is typically either an alkali (i.e., Group I) or alkaline earth (i.e., Group II) metal cation. However, boron-group (i.e., Group III), carbon-group (i.e., Group IV, except those halocarbons which contain only a covalent instead of an ionic carbon-halogen bond), nitrogen-group (i.e., Group V, except for nitrogen halides), and transition-metal halide compounds are also considered herein, as long as the halide compound or material is not corrosive to the lithium anode. The halide additive is preferably completely soluble in the matrix material. The halide additive can be, for example, one or more lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), magnesium halides (e.g., $MgF_2$, $MgCl_2$, $MgBr_2$, $MgI_2$), calcium halides (e.g., $CaF_2$, $CaCl_2$, $CaBr_2$, $CaI_2$), strontium halides (e.g., $SrF_2$, $SrCl_2$, $SrBr_2$, $SrI_2$), barium halides (e.g., $BaF_2$, $BaCl_2$, $BaBr_2$, $BaI_2$), Group III halides (e.g., $BF_3$, $BCl_3$, $AlF_3$, $AlCl_3$, TlF, TlCl, and related compounds or complexes), Group IV halides (e.g., $SiCl_4$, $SnCl_2$, $SnCl_4$), Group V halides (e.g., $PCl_3$, $AsCl_3$, $SbCl_3$, $SbCl_5$), transition-metal halides (e.g., $TiCl_4$, $ZnCl_2$), rare-earth halides (e.g., $LaF_3$, $LaCl_3$, $CeF_3$, $CeCl_3$), ammonium halides (e.g., $NH_4F$, $NH_4Cl$, $NH_4Br$, $NH_4I$), alkylammonium halides (e.g., $MeNH_3Cl$, $Me_2NH_2Cl$, $Me_3NHCl$, $Me_4NCl$, $Et_4NCl$, $Bu_4NF$, $Bu_4NBr$, where Me is methyl, Et is ethyl, and bu is n-butyl), or a combination of any of these. In other embodiments, one or more of the foregoing groups of halide compounds or materials are excluded from the electrolyte medium.

Preferably, the halide-containing additive is present in the electrolyte medium in at least a trace amount (e.g., at least 0.001 M or 0.001 m, where "M" indicates a molarity concentration and "m" indicates a molality concentration). In different embodiments, the halide additive is present in a minimum amount of, for example, 0.01 M, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, or 1.5 M. In other embodiments, the halide additive is present in a maximum amount of, for example, 0.5 M, 0.6 M, 0.7 M, 0.8 M, 0.9 M, 1.0 M, 1.1 M, 1.2 M, 1.3 M, 1.4 M, 1.5 M, 1.6 M, 1.7 M, 1.8 M, 2.0 M, 2.1 M, 2.2 M, 2.3 M, 2.4 M, or 2.5 M. In other embodiments, the halide additive is present in an amount within a range bounded by any combination of minimum and maximum values given above, provided that the minimum value is less than the maximum value. Any of the concentrations given above in terms of molarity (M) can alternatively be understood to be molality (m) concentrations.

In the case of a liquid electrolyte medium, the matrix is a liquid, i.e., composed of one or more solvents. The solvent can be, for example, ionic (e.g., an ionic liquid) or non-ionic. The one or more solvents are preferably non-reactive with the materials of the anode and the cathode, and furthermore, do not have a deleterious effect on the performance characteristics of the lithium ion battery.

In some embodiments, the one or more solvents are non-ionic solvents. The non-ionic solvent typically has a melting point no more or less than 100, 90, 80, 70, 60, or 50° C., and more typically, below room temperature, i.e., below about 25° C., and more typically, up to or less than 20, 15, 10, 5, or 0° C. The non-ionic solvent, which is typically also an aprotic polar solvent, can be, for example, a carbonate, sulfone, siloxane, silane, ether, ester, nitrile, sulfoxide, or amide solvent, or a mixture thereof. Some examples of carbonate solvents include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC). Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethyl(ethyl)sulfone). Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The non-ionic solvent can be included in a non-additive or additive amount, such as any of the exemplary amounts provided above for the ionic liquids. The non-ionic solvent may also be, for example, an organochloride (e.g., methylene chloride, chloroform, 1,1,-trichloroethane), ketone (e.g., acetone, 2-butanone), organoethers (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

In some embodiments, the one or more solvents contain one or more oxyether (i.e., carbon-oxygen-carbon) groups. The one or more solvents can be ether solvents, i.e., polar aprotic solvents formulated as hydrocarbons except that they contain one or more carbon-oxygen-carbon groups (e.g., one, two, three, four, five, or six C—O—C groups) in the absence of any other chemical groups. The ether solvents typically contain at least three, four, five, six, seven, or eight carbon atoms, and up to nine, ten, eleven, twelve, or higher number of carbon atoms, and can be acyclic or cyclic. The ether solvent may also be saturated, or alternatively, unsaturated (i.e., by the presence of one or more carbon-carbon double or triple bonds).

Some examples of acyclic ether solvents containing one oxygen atom include diethyl ether, di(n-propyl)ether, diisopropyl ether, diisobutyl ether, methyl(t-butyl)ether, and anisole. Some examples of acyclic ether solvents containing two or more oxygen atoms include ethylene glycol dimethyl ether (i.e., dimethoxyethane, or DME, or glyme), diethylene glycol dimethyl ether (diglyme), triethylene glycol dimethyl ether (triglyme), and tetraethylene glycol dimethyl ether (tetraglyme). The foregoing exemplary acyclic ether solvents all contain methyl groups as endcapping groups. However, any hydrocarbon endcapping groups are suitable. Some common endcapping groups aside from methyl groups include, allyl, vinyl, n-propyl, isopropyl, n-butyl, isobutyl, sec-butyl, and t-butyl groups.

Some examples of cyclic ether solvents containing one oxygen atom include propylene oxide, 2,3-epoxybutane (i.e., 2,3-dimethyloxirane), oxetane, tetrahydrofuran (THF), furan, tetrahydropyran, and pyran. Some examples of cyclic ether solvents containing two or more oxygen atoms include 1,3-dioxolane, 1,3-dioxane, 1,4-dioxane, 1,3,5-trioxane, and the crown ethers.

In some embodiments, the electrolyte medium includes a non-polar liquid. Some examples of non-polar liquids include the liquid hydrocarbons, such as a pentane, hexane, heptane, octane, pentene, hexene, heptene, octene, benzene, toluene, or xylene. In another embodiment, non-polar liquids are excluded from the electrolyte medium.

In some embodiments, the one or more solvents include at least one solvent which is an aprotic ether solvent that has a tendency to polymerize, particularly in the presence of a halide (as provided, for example, when a halide-containing additive is included). Particularly preferred in this respect are the cyclic ethers, and in particular, one or a combination of solvents selected from 1,3-dioxolane, dimethoxyethane, and 1,3,5-trioxane. The polymerization of these solvents during cycling in the presence of a halide-containing additive may improve the cycling performance of lithium-sulfur batteries.

In other embodiments, the electrolyte includes one or more ionic liquids. The ionic liquid can be, for example, of the formula Y⁺X⁻, wherein Y⁺ is a cationic component of the ionic liquid and X⁻ is an anionic component of the ionic liquid. The formula (Y⁺)(X⁻) is meant to encompass a cationic component (Y⁺) having any valency of positive charge, and an anionic component (X⁻) having any valency of negative charge, provided that the charge contributions from the cationic portion and anionic portion are counterbalanced in order for charge neutrality to be preserved in the ionic liquid molecule. More specifically, the formula (Y⁺)(X⁻) is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables). The foregoing generic formula encompasses numerous possible sub-formulas, such as, for example, (Y⁺)(X⁻), $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. For simplicity, numerous embodiments of ionic liquids, described below, designate the anion as X⁻, which in its strict sense indicates a monovalent anion. However, the anion designated as X⁻ is meant to encompass an anion of any valency, such as any of the valencies described above and further below, unless otherwise specified.

The ionic liquid is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

The density of the ionic liquid is generally above 1.2 g/mL at an operating temperature of interest, and particularly at a temperature within 20-30° C. In different embodiments, the density of the ionic liquid can be at least 1.2, 1.3, 1.4, 1.5, 1.6, 1.7, or 1.8 g/mL, or a particular range bounded by any two of these values.

The viscosity of the ionic liquid is typically no more than 50,000 centipoise (50,000 cP) at an operating temperature of interest, and particularly at a temperature within 20-30° C. More typically, the viscosity of the ionic liquid is no more than about 25,000 cP, 10,000 cP, 5,000 cP, 2,000 cP, 1,000 cP, 800 cP, 700 cP, 600 cP, 500 cP, 400 cP, 300 cP, 200 cP, 100 cP, or 50 cP.

In one set of embodiments, the cationic portion (Y⁺) of the ionic liquid Y⁺X⁻ is an ammonium species. In some embodiments, the ammonium cation portion includes a heterocyclic ring having a positively-charged ring nitrogen atom. The heterocyclic ring having a positively-charged ring nitrogen atom can be monocyclic, bicyclic, tricyclic, or a higher cyclic (polycyclic) ring system. Some examples of a heterocyclic ring having a positively-charged ring nitrogen atom include imidazolium, pyridinium, pyrazinium, pyrrolidinium, piperidinium, piperazinium, morpholinium, pyrrolium, pyrazolium, pyrimidinium, triazolium, oxazolium, thiazolium, triazinium, and cyclic guanidinium rings. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may be substituted by one or more hydrocarbon groups (R) as further described below. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids: Properties and Applications", *Chem. Rev.*, 108, pp. 206-237 (2008), the contents of which are herein incorporated by reference in their entirety. Any of the ionic liquids described in the foregoing reference may be used herein.

Some general examples of imidazolium-based ionic liquids according to Formula (1) include 1,3-dimethylimidazolium⁺X⁻, 1,2,3-trimethylimidazolium⁺X⁻, 2-ethyl-1,3-dimethylimidazolium⁺X⁻, 2-n-propyl-1,3-dimethylimidazolium⁺X⁻, 2-n-butyl-1,3-dimethylimidazolium⁺X⁻, 1-ethyl-2,3-dimethylimidazolium⁺X⁻, 1-n-propyl-2,3-dimethylimidazolium⁺X⁻, 1-n-butyl-2,3-dimethylimidazolium⁺X⁻, 1-methyl-3-ethylimidazolium⁺X⁻, 1-methyl-3-n-propylimidazolium⁺X⁻, 1-methyl-3-isopropylimidazolium⁺X⁻, 1-methyl-3-n-butylimidazolium⁺X⁻ (i.e., BMIM⁺X⁻), 1-methyl-3-isobutylimidazolium⁺X⁻, 1-methyl-3-sec-butylimidazolium⁺X⁻, 1-methyl-3-t-butylimidazolium⁺X⁻, 1,3-diethylimidazolium⁺X⁻, 1-ethyl-3-n-propylimidazolium⁺X⁻, 1-ethyl-3-isopropylimidazolium⁺X⁻, 1-ethyl-3-n-butylimidazolium⁺X⁻, 1-ethyl-3-isobutylimidazolium⁺X⁻, 1-ethyl-3-sec-butylimidazolium⁺X⁻, 1-ethyl-3-t-butylimidazolium⁺X⁻, 1,3-di-n-propylimidazolium⁺X⁻, 1-n-propyl-3-isopropylimidazolium⁺X⁻, 1-n-propyl-3-n-butylimidazolium⁺X⁻, 1-n-propyl-3-isobutylimidazolium⁺X⁻, 1-n-propyl-3-sec-butylimidazolium⁺X⁻, 1-n-propyl-3-t-butylimidazolium⁺X⁻, 1,3-diisopropylimidazolium⁺X⁻, 1-isopropyl-3-n-butylimidazolium⁺X⁻, 1-isopropyl-3-isobutylimidazolium⁺X⁻, 1-isopropyl-3-sec-butylimidazolium⁺X⁻, 1-isopropyl-3-t-butylimidazolium⁺X⁻, 1,3-di-n-butylimidazolium⁺X⁻, 1-n-butyl-3-isobutylimidazolium⁺X⁻, 1-n-butyl-3-sec-butylimidazolium⁺X⁻, 1-n-butyl-3-t-butylimidazolium⁺X⁻, 1,3-diisobutylimidazolium⁺X⁻, 1-isobutyl-3-sec-butylimidazolium⁺X⁻, 1-isobutyl-3-t-butylimidazolium⁺X⁻, 1,3-di-sec-butylimidazolium⁺X⁻, 1-sec-butyl-3-t-butylimidazolium⁺X⁻, 1,3-di-t-butylimidazolium⁺X⁻, 1-methyl-3-pentylimidazolium⁺X⁻, 1-methyl-3-hexylimidazolium⁺X⁻, 1-methyl-3-heptylimidazolium⁺X⁻, 1-methyl-3-octylimidazolium⁺X⁻, 1-methyl-3-decylimidazolium⁺X⁻, 1-methyl-3-dodecylimidazolium⁺X⁻, 1-methyl-3-tetradecylimidazolium⁺X⁻, 1-methyl-3-hexadecylimidazolium⁺X⁻, 1-methyl-3-octadecylimidazolium⁺X⁻, 1-(2-hydroxyethyl)-3-methylimidazolium⁺X⁻, and 1-allyl-3-methylimidazolium⁺X⁻.

Some examples of pyridinium ionic liquids include N-methyl-4-methylpyridinium X⁻, N-ethyl-4-methylpyridinium X⁻, N-methyl-4-ethylpyridinium X⁻, N-methyl-4-isopropylpyridinium X⁻, N-isopropyl-4-methylpyridinium X⁻, and N-octyl-4-methylpyridinium X⁻.

Some examples of quaternary ammonium ionic liquids include methylammonium⁺X⁻, dimethylammonium⁺X⁻, trimethylammonium⁺X⁻, tetramethylammonium⁺X⁻, ethylammonium⁺X⁻, ethyltrimethylammonium⁺X⁻, diethylammonium⁺X⁻, triethylammonium⁺X⁻, tetraethylammonium⁺X⁻, n-propylammonium⁺X⁻, n-propyltrimethylammonium⁺X⁻, isopropylammonium⁺X⁻, n-butylammonium⁺X⁻, n-butyltrimethylammonium⁺X⁻, n-butylmethylammonium⁺X⁻, di-(n-butyl)dimethylammonium⁺X⁻, tri-(n-butyl)methylammonium⁺X⁻, n-pentylammonium⁺X⁻, n-pentyltrimethylammonium⁺X⁻, tri-(n-pentyl)methylammonium⁺X⁻, n-hexylammonium⁺X⁻, n-hexyltrimethylammonium⁺X⁻, tri-(n-hexyl)methylammonium⁺X⁻, n-heptyltrimethylammonium⁺X⁻, tri-(n-heptyl)methylammonium⁺X⁻, n-octylammonium⁺X⁻, n-octyltrimethylammonium⁺X⁻, tri-(n-octyl)methylammonium⁺X⁻, benzyltrimethylammonium⁺X⁻, choline⁺X⁻, 2-hydroxyethylammonium⁺X⁻, allylammonium⁺X⁻, allyltrimethylammonium⁺X⁻, [(2-methacryloxy)ethyl]-trimethylammonium⁺X⁻, and (4-vinylbenzyl)trimethylammonium⁺X⁻.

Some examples of piperidinium-based ionic liquids include 1,1-dimethylpiperidinium⁺X⁻, 1-methyl-1-ethylpiperidinium⁺X⁻, 1-methyl-1-propylpiperidinium⁺X⁻, 1-methyl-1-butylpiperidinium⁺X⁻, 1-methyl-1-isobutylpiperidinium⁺X⁻, 1-methyl-1-pentylpiperidinium⁺X⁻, 1-methyl-1-hexylpiperidinium⁺X⁻, 1-methyl-1-heptylpiperidinium⁺X⁻, 1-methyl-1-octylpiperidinium⁺X⁻, 1-methyl-1-decylpiperidinium⁺X⁻, 1-methyl-1-dodecylpiperidinium⁺X⁻, 1-methyl-1-tetradecylpiperidinium⁺X⁻, 1-methyl-1-hexadecylpiperidinium⁺X⁻, 1-methyl-1-octadecylpiperidinium⁺X⁻, 1,1-diethylpiperidinium⁺X⁻, 1,1-dipropylpiperidinium⁺X⁻, 1,1-dibutylpiperidinium⁺X⁻, and 1,1-diisobutylpiperidinium⁺X⁻.

Some examples of pyrrolidinium-based ionic liquids include 1,1-dimethylpyrrolidinium⁺X⁻, 1-methyl-1-ethylpyrrolidinium⁺X⁻, 1-methyl-1-propylpyrrolidinium⁺X⁻, 1-methyl-1-butylpyrrolidinium⁺X⁻, 1-methyl-1-isobutylpyrrolidinium⁺X⁻, 1-methyl-1-pentylpyrrolidinium⁺X⁻, 1-methyl-1-hexylpyrrolidinium⁺X⁻, 1-methyl-1-heptylpyrrolidinium⁺X⁻, 1-methyl-1-octylpyrrolidinium⁺X⁻, 1-methyl-1-decylpyrrolidinium⁺X⁻, 1-methyl-1-dodecylpyrrolidinium⁺X⁻, 1-methyl-1-tetradecylpyrrolidinium⁺X⁻, 1-methyl-1-hexadecylpyrrolidinium⁺X⁻, 1-methyl-1-octadecylpyrrolidinium⁺X⁻, 1,1-diethylpyrrolidinium⁺X⁻, 1,1-dipropylpyrrolidinium⁺X⁻, 1,1-dibutylpyrrolidinium⁺X⁻, and 1,1-diisobutylpyrrolidinium⁺X⁻.

In other embodiments, the ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., Z. Naturforsch, 65b, pp. 37-48, 2010, the contents of which are herein incorporated by reference in their entirety.

In other embodiments, the ionic liquid is a phosphonium-based ionic liquid. Some general examples of phosphonium-based ionic liquids include tetramethylphosphonium⁺X⁻, tetraethylphosphonium⁺X⁻, tetrapropylphosphonium⁺X⁻, tetrabutylphosphonium⁺X⁻, tetrapentylphosphonium⁺X⁻, tetrahexylphosphonium⁺X⁻, tetraheptylphosphonium⁺X⁻, tetraoctylphosphonium⁺X⁻, tetranonylphosphonium⁺X⁻, tetradecylphosphonium⁺X⁻, tetraphenylphosphonium⁺X⁻, tetrabenzylphosphonium⁺X⁻, ethyltrimethylphosphonium⁺X⁻, n-propyltrimethylphosphonium⁺X⁻, butyltrimethylphosphonium⁺X⁻, dibutyldimethylphosphonium⁺X⁻, tributylmethylphosphonium⁺X⁻, butyltriethylphosphonium⁺X⁻, dibutyldiethylphosphonium⁺X⁻, tributylethylphosphonium⁺X⁻, triisobutylmethylphosphonium⁺X⁻, tributylhexylphosphonium⁺X⁻, tributylheptylphosphonium⁺X⁻, tributyloctylphosphonium⁺X⁻, tributyldecylphosphonium⁺X⁻, tributyldodecylphosphonium⁺X⁻, tributyltetradecylphosphonium⁺X⁻, tributylhexadecylphosphonium⁺X⁻, hexyltrimethylphosphonium⁺X⁻, dihexyldimethylphosphonium⁺X⁻, trihexylmethylphosphonium⁺X⁻, hexyltriethylphosphonium⁺X⁻, trihexyloctylphosphonium⁺X⁻, trihexyldecylphosphonium⁺X⁻, trihexyldodecylphosphonium⁺X⁻, trihexyltetradecylphosphonium⁺X⁻, trihexylhexadecylphosphonium⁺X⁻, octyltrimethylphosphonium⁺X⁻, dioctyldimethylphosphonium⁺X⁻, trioctylmethylphosphonium⁺X⁻, octyltriethylphosphonium⁺X⁻, trioctyldecylphosphonium⁺X⁻, trioctyldodecylphosphonium⁺X⁻, trioctyltetradecylphosphonium⁺X⁻, trioctylhexadecylphosphonium⁺X⁻, tridecylmethylphosphonium⁺X⁻, phenyltrimethylphosphonium⁺X⁻, phenyltriethylphosphonium⁺X⁻, phenyltripropylphosphonium⁺X⁻, phenyltributylphosphonium⁺X⁻, diphenyldimethylphosphonium⁺X⁻, triphenylmethylphosphonium⁺X⁻, and benzyltrimethylphosphonium⁺X⁻.

In other embodiments, the ionic liquid is a sulfonium-based ionic liquid. Some general examples of sulfonium-based ionic liquids include trimethylsulfonium⁺X⁻, dimethylethylsulfonium⁺X⁻, diethylmethylsulfonium⁺X⁻, triethylsulfonium⁺X⁻, dimethylpropylsulfonium⁺X⁻, dipropylmethylsulfonium⁺X⁻, tripropylsulfonium⁺X⁻, dimethylbutylsulfonium⁺X⁻, dibutylmethylsulfonium⁺X⁻, tributylsulfonium⁺X⁻, dimethylhexylsulfonium⁺X⁻, dihexylmethylsulfonium⁺X⁻, trihexylsulfonium⁺X⁻, dimethyloctylsulfonium⁺X⁻, dioctylmethylsulfonium⁺X⁻, and trioctylsulfonium⁺X⁻.

The counteranion (X⁻) of the ionic liquid is any counteranion which, when associated with the cationic component, permits the resulting ionic compound to behave as an ionic liquid. As known in the art, the composition and structure of the counteranion strongly affects the properties (e.g., melting point, volatility, stability, viscosity, hydrophobicity, and so on) of the ionic liquid. In some embodiments, the counteranion is structurally symmetrical, while in other embodiments, the counteranion is structurally asymmetrical.

In one embodiment, the counteranion (X⁻) of the ionic liquid is non-carbon-containing (i.e., inorganic). The inorganic counteranion may, in one embodiment, lack fluorine atoms. Some examples of such counteranions include chloride, bromide, iodide, hexachlorophosphate ($PCl_6^-$), perchlorate, chlorate, chlorite, cyanate, isocyanate, thiocyanate, isothiocyanate, perbromate, bromate, bromite, periodiate, iodate, dicyanamide (i.e., $N(CN)_2^-$), tricyanamide (i.e., $N(CN)_3^-$), aluminum chlorides (e.g., $Al_2Cl_7^-$ and $AlCl_4^-$), aluminum bromides (e.g., $AlBr_4^-$), nitrate, nitrite, sulfate, sulfite, hydrogensulfate, hydrogensulfite, phosphate, hydrogenphosphate ($HPO_4^{2-}$), dihydrogenphosphate ($H_2PO_4^-$), phosphite, arsenate, antimonate, selenate, tellurate, tungstate, molybdate, chromate, silicate, the borates (e.g., borate, diborate, triborate, tetraborate), anionic borane and carborane clusters (e.g., $B_{10}H_{10}^{2-}$ and $B_{12}H_{12}^{2-}$), perrhenate, permanganate, ruthenate, perruthenate, and the polyoxometallates. The inorganic counteranion may, in another embodiment, include fluorine atoms. Some examples of such counteranions include fluoride, bifluoride ($HF_2^-$), hexafluorophosphate ($PF_6^-$), fluorophosphate ($PO_3F^{2-}$), tetrafluoroborate ($BF_4$—), aluminum fluorides (e.g., $AlF_4^-$), hexafluoroarsenate ($AsF_6^-$), and hexafluoroantimonate ($SbF_6^-$).

In another embodiment, the counteranion (X⁻) of the ionic liquid is carbon-containing (i.e., organic). The organic counteranion may, in one embodiment, lack fluorine atoms. Some examples of such counteranions include carbonate, bicarbonate, the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic counteranion may, in another embodiment, include fluorine atoms. Some examples of such counteranions include the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In particular embodiments, the counteranion ($X^-$) of the ionic liquid has a structure according to the following general formula:

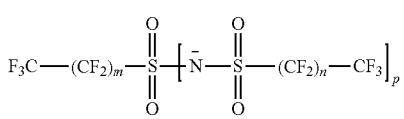

(1)

In Formula (1) above, subscripts m and n are independently 0 or an integer of 1 or above. Subscript p is 0 or 1, provided that when p is 0, the group —N—$SO_2$—$(CF_2)_n CF_3$ subtended by p is replaced with an oxide atom connected to the sulfur atom (S).

In one embodiment of Formula (1), subscript p is 1, so that Formula (9) reduces to the chemical formula:

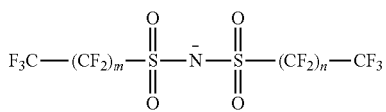

(1a)

In one embodiment of Formula (1a), m and n are the same number, thereby resulting in a symmetrical counteranion. In another embodiment of Formula (1a), m and n are not the same number, thereby resulting in an asymmetrical counteranion.

In a first set of embodiments of Formula (1a), m and n are independently at least 0 and up to 1, 2, 3, 4, 5, 6, 7, 8, 9, 10, or 11. When m and n are both 0, the resulting anion has the formula $F_3CSO_2NSO_2CF_3$, i.e., bis-(trifluoromethylsulfonyl)imide, or $Tf_2N^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include $F_3CSO_2NSO_2CF_2CF_3$, $F_3CSO_2NSO_2(CF_2)_2CF_3$, $F_3CSO_2NSO_2(CF_2)_3CF_3$, $F_3CSO_2NSO_2(CF_2)_4CF_3$, $F_3CSO_2NSO_2(CF_2)_5CF_3$, and so on, wherein it is understood that, in the foregoing examples, the negative sign indicative of a negative charge (i.e., "−") in the anion has been omitted for the sake of clarity.

In a second set of embodiments of Formula (1a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include $N[SO_2CF_2CF_3]_2$ (i.e., "BETI$^-$"), $F_3CF_2CSO_2NSO_2(CF_2)_2CF_3$, $F_3CF_2CSO_2NSO_2(CF_2)_3CF_3$, $F_3CF_2CSO_2NSO_2(CF_2)_4 CF_3$, $F_3CF_2CSO_2NSO_2(CF_2)_5CF_3$, and so on.

In a third set of embodiments of Formula (1a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include $N[SO_2(CF_2)_2CF_3]_2$, $F_3C(F_2C)_2SO_2NSO_2(CF_2)_3CF_3$, $F_3C(F_2C)_2SO_2NSO_2(CF_2)_4CF_3$, $F_3C(F_2C)_2SO_2NSO_2(CF_2)_5CF_3$, and so on.

In a fourth set of embodiments of Formula (1a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include $N[SO_2(CF_2)_3CF_3]_2$, $F_3C(F_2C)_3SO_2NSO_2(CF_2)_4CF_3$, $F_3C(F_2C)_3SO_2NSO_2(CF_2)_5 CF_3$, $F_3C(F_2C)_3SO_2NSO_2(CF_2)_6CF_3$, $F_3C(F_2C)_3SO_2NSO_2(CF_2)_7CF_3$, and so on.

In a fifth set of embodiments of Formula (1a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include $N[SO_2(CF_2)_4CF_3]_2$, $F_3C(F_2C)_4SO_2NSO_2(CF_2)_5CF_3$, $F_3C(F_2C)_4SO_2NSO_2(CF_2)_6 CF_3$, $F_3C(F_2C)_4SO_2NSO_2(CF_2)_7CF_3$, $F_3C(F_2C)_4SO_2NSO_2(CF_2)_8CF_3$, and so on.

In a sixth set of embodiments of Formula (1a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include $N[SO_2(CF_2)_5CF_3]_2$, $F_3C(F_2C)_5SO_2NSO_2(CF_2)_6CF_3$, $F_3C(F_2C)_5SO_2NSO_2(CF_2)_7CF_3$, $F_3C(F_2C)_5SO_2NSO_2(CF_2)_8CF_3$, $F_3C(F_2C)_5SO_2NSO_2(CF_2)_9CF_3$, and so on.

In a seventh set of embodiments of Formula (1a), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include $N[SO_2(CF_2)_6CF_3]_2$, $F_3C(F_2C)_6SO_2NSO_2(CF_2)_7CF_3$, $F_3C(F_2C)_6SO_2NSO_2(CF_2)_8 CF_3$, $F_3C(F_2C)_6SO_2NSO_2(CF_2)_9CF_3$, $F_3C(F_2C)_6SO_2NSO_2(CF_2)_{10}CF_3$, and so on.

In other embodiments of Formula (1a), m abides by one or a number of alternative conditions set forth in one of the foregoing seven embodiments while n abides by one or a number of alternative conditions set forth in another of the foregoing seven embodiments.

In another embodiment of Formula (1), subscript p is 0, so that Formula (1) reduces to the chemical formula:

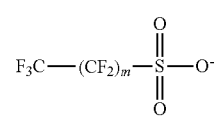

(1b)

In different exemplary embodiments of Formula (1b), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfO$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

In some embodiments, any one or more classes or specific types of anions described above iare excluded from the ionic liquid. In other embodiments, a combination of anions is used in the ionic liquid.

The ionic liquid can be of any suitable purity level. Preferably, the ionic liquid has a purity at least or greater than 90%, 95%, 96%, 97%, 98%, 99%, 99.5%, or 99.9%. The ionic liquid is preferably substantially devoid of salt byproducts (e.g., LiNO$_3$) that are typically produced during synthesis of the ionic liquid. In preferred embodiments, it is desirable that the ionic liquid contains less than 1% by weight of salt byproducts, and more preferably, less than 0.5%, 0.1%, 0.01%, or even 0.001% by weight of salt byproducts.

The electrolyte medium generally excludes a protic liquid. Protic liquids are generally reactive with the lithium anode. Some examples of polar protic solvents that are preferably excluded include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine).

A non-ionic solvent additive may or may not also be included in the electrolyte. The non-ionic solvent additive can be, for example, any of the non-ionic solvent additives described above, but is more typically any such solvent that possesses one or more unsaturated groups containing a carbon-carbon double bond and/or one or more halogen atoms. Some particular examples of solvent additives include vinylene carbonate (VC), vinyl ethylene carbonate, allyl ethyl carbonate, vinyl acetate, divinyl adipate, acrylic acid nitrile, 2-vinyl pyridine, maleic anhydride, methyl cinnamate, ethylene carbonate, halogenated ethylene carbonate, bromobutyrolactone, methyl chloroformate, and sulfite additives, such as ethylene sulfite (ES), propylene sulfite (PS), and vinyl ethylene sulfite (VES). An additive of particular interest herein is vinylene carbonate (VC) or a derivative thereof. In other particular embodiments, the additive is preferably selected from 1,3-propanesultone, ethylene sulfite, propylene sulfite, fluoroethylene sulfite (FEC), α-bromo-γ-butyrolactone, methyl chloroformate, t-butylene carbonate, 12-crown-4 ether, carbon dioxide (CO$_2$), sulfur dioxide (SO$_2$), sulfur trioxide (SO$_3$), acid anhydrides, reaction products of carbon disulfide and lithium, and polysulfide.

The electrolyte medium may or may not also include one or more surfactants. The surfactants can be included to, for example, modify or adjust the electrolyte electron or ion transport properties. The surfactant can be either an anionic, cationic, or zwitterionic surfactant.

Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), and the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts).

The majority of cationic surfactants contain a positively charged nitrogen atom, such as found in the quaternary ammonium surfactants. A particular class of cationic surfactants considered herein include the quaternary ammonium surfactants. Some examples of quaternary ammonium surfactants include the alkyltrimethylammonium salts, dialkylmethylammonium salts, trialkylmethylammonium salts, and tetraalkylammonium salts, wherein the alkyl group typically possesses at least 3, 4, 5, or 6 carbon atoms and up to 14, 16, 18, 20, 22, 24, or 26 carbon atoms. Another group of cationic surfactants are the pyridinium surfactants, such as cetylpyridinium chloride. The counteranions in the cationic surfactants can be, for example, a halide, hydroxide, carboxylate, phosphate, nitrate, or other simple or complex anion.

Some examples of zwitterionic surfactants include the betaines (e.g., dodecyl betaine, cocamidopropyl betaine) and the glycinates.

Examples have been set forth below for the purpose of illustration and to describe certain specific embodiments of the invention. However, the scope of this invention is not to be in any way limited by the examples set forth herein.

Example 1

Preparation and Analysis of PAF-S, an S/N-Doped Electron-Conducting Polymer Electroactive Microporous Organic Molecular Sieve Synthesis of PAF-S The synthesis and characterization of the precursor, PAF, is disclosed in *J. Mater. Chem.*, 2011, 21, 18208-18214. PAF-S was prepared by grounding PAF powder (0.1 g) and sulfur (0.5 g) together, followed by heating at 155° C. for 12 h in a sealed vessel. The composite was then heated to and kept at 300° C. for 1 hour under argon to evaporate the surface sulfur.

Characterization of PAF-S

FIG. 1 shows the TGA curves of pure PAF and its sulfur composite PAF-S. The carbon yield of pure PAF-S at 700° C. was found to be 78%. The sulfur content within the composite after heat treatment at 300° C. was found to be 30 wt %.

Composite Preparation and Electrode Assembly using PAF-S

The sulfur electrode was made by casting a well-homogenized slurry of PAF-S (65 wt %), carbon black (20 wt %), and PVdF (15 wt %) in NMP on aluminum foil using a doctor blade. The dried electrodes were pressed under a hydraulic load of 1 ton for 1 minute before cutting into discs of 1.3 cm diameter. The discs were further dried at 60° C. under vacuum for 24 hours before being transferred into a glovebox for battery assembly. The batteries were assembled as 2032-type coin cells inside an argon-filled glovebox by using the PAF-S composite electrode as the cathode, lithium metal as the counter electrode, Celgard® 3401 as the separator, and either 0.5 M LiTFSI/MPPY.TFSI or 1.0M LiPF$_6$/methylisopropylsulfone (MiPS) as the electrolyte.

Cell Performance of PAF-S Composite Electrode

FIGS. 2A, 2B and 3A, 3B show the cell performance for the PAF-S composite electrode at different temperatures using different electrolytes. FIG. 2A shows the discharge (Li uptake)/charge (Li removal) curves of the PAF-S at a rate of 0.05 C (84 mA/g) in 1 M LiPF$_6$/MiPS at 25° C. FIG. 2B shows the cycle performance of PAF-S electrode in 1 M LiPF$_6$/MiPS at 25° C. The PAF-S electrode exhibited a reversible capacity of 1083 mAh g$^{-1}$ (second cycle) by using the electrolyte of 1 M LiPF$_6$/MiPS. After 50 cycles, the capacity was still maintained at 630 mAh g$^{-1}$. FIG. 3A shows the discharge/charge curves of the PAF-S at a rate of 0.05 C in 0.5M LiTFSI/MPPY.TFSI at 50° C. FIG. 3B shows the cycle performance of PAF-S electrode in 0.5M LiTFSI/MPPY.TFSI at 50° C.

Example 2

Preparation and Analysis of S/N-Doped Mesoporous Carbon

Synthesis of S/N-Doped Mesoporous Carbon

Mesoporous carbon was synthesized by carbonization of a nanostructured polymeric composite that was obtained by self-assembly of a block copolymer (i.e., Pluronic® F127) and phenol resin (i.e., phloroglucinol-formaldehyde) under acidic conditions via a soft-template method (*Advanced Materials*, 2011, 23, 3450-3454). In a typical synthesis, phloroglucinol (26.2 g), F127 (EO$_{106}$-PO$_{70}$-EO$_{106}$, BASF, 52.4 g), and aqueous HCl (10.0 g, 37 wt %) in ethanol (1.3 L, 200 proof) were charged into a 2 L flask. The mixture was heated to reflux under stirring before an aqueous formaldehyde solution (26.0 g, 37 wt %) was added. The reaction was continued for two hours and filtered. Yellow polymer particles on the filter were washed with ethanol and dried in an oven at 120° C. for three hours. The carbonization was conducted under nitrogen gas flow in a tubular furnace by heating the polymer particles to 850° C. at a heating rate of 2° C. per minute. The final temperature (850° C.) was held for two hours to ensure the complete decomposition of the template and carbonization of the polymer. Nitrogen-doped mesoporous carbon was prepared by heat treatment of the above obtained mesoporous carbon under NH$_3$ (50 mL/min) at 850° C. for two hours.

S/N-doped mesoporous carbon and sulfur composite was prepared by grinding nitrogen-doped mesoporous carbon (0.1 g) and sulfur (0.3 g) together, followed by heating at 155° C. for 12 hours in a sealed vessel. The composite was then heated to and kept at 300° C. for 1 hour under argon to evaporate the surface sulfur.

Characterization of S/N-Doped Mesoporous Carbon Material

Figure 4:
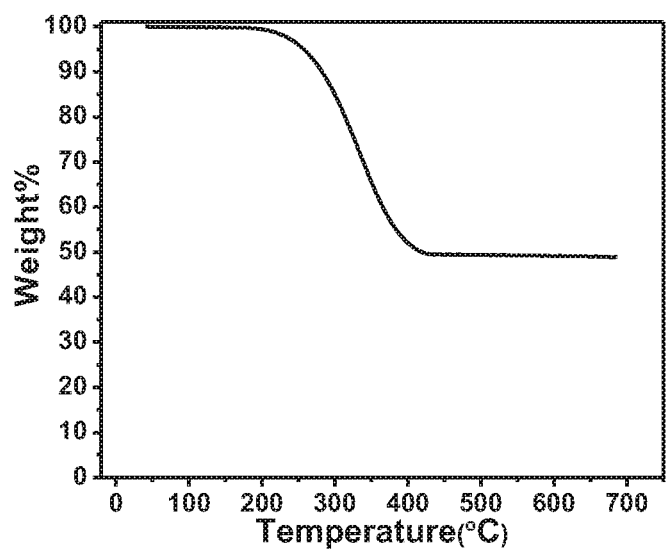
FIG. 4. Graph showing TGA trace for S/N-doped mesoporous carbon material.

FIG. 4 shows the TGA curve of S/N-doped mesoporous carbon, whose preparation was described above. As shown, the sulfur loading within the composite after heat treatment at 300° C. was found to be 50 wt %.

Composite Preparation and Electrode Assembly using S/N-Doped Mesoporous Carbon

The sulfur electrode was made by casting a well-homogenized slurry of S/N-doped mesoporous carbon (65 wt %), carbon black (20 wt %), and PVdF (15 wt %) in NMP on aluminum foil using a doctor blade. The dried electrodes were pressed under a hydraulic load of 1 ton for 1 minute before cutting into discs of 1.3 cm diameter. The discs were further dried at 60° C. under vacuum for 24 hours before being transferred into a glovebox for battery assembly. The batteries were assembled as 2032-type coin cells inside an argon-filled glovebox by using the S/N-doped mesoporous carbon composite electrode as the cathode, lithium metal as the counter electrode, Celgard® 3401 as the separator, and 0.5 M LiTFSI/MPPY.TFSI as the electrolyte.

Cell Performance of S/N-Doped Mesoporous Carbon Composite Electrode

FIGS. 5A, 5B show charge/discharge profile and cycle performance for the mesoporous carbon composite electrode using 0.5 M LiTFSI/MPPY.TFSI at room temperature (typically, 18-22° C., or about 20° C.).

Example 3

Preparation and Analysis of S/N-Doped Mesoporous Carbon Admixed with Carbon Nanotube (CNT), i.e., "CNT-Mesoporous Carbon"

Synthesis of CNT-Mesoporous Carbon

In this example, 10 wt % of carbon nanotube was added to nitrogen-doped mesoporous carbon, and this used to prepare the sulfur composite. CNT-Mesoporous carbon was prepared via self-assembly of block copolymer and phloroglucinol-formaldehyde resin under acidic conditions. In a typical synthesis, a 2 L flask was charged with 26.2 g of phloroglucinol, 52.4 g of Pluronic® F127, (EO$_{106}$-PO$_{70}$-EO$_{106}$, BASF), 10.0 g of aqueous HCl (37 wt %) and 2 g of carbon nanotubes (CNT) in 1300 mL of ethanol (200 proof). The mixture was heated to reflux with stirring. To this solution, 26.0 g of formaldehyde aqueous solution (37 wt %) was added. The reaction mixture was stirred for two hours and then filtered. The obtained polymer particles were washed with ethanol and dried in an oven at 120° C. for 3 hours. Carbonization was conducted under a nitrogen atmosphere at 400° C. for two hours at a heating rate of 1° C. per minute, which was followed by treatment at 850° C. for two hours at a heating rate of 5° C. per minute.

Characterization of CNT-Mesoporous Carbon Material

Figure 6:
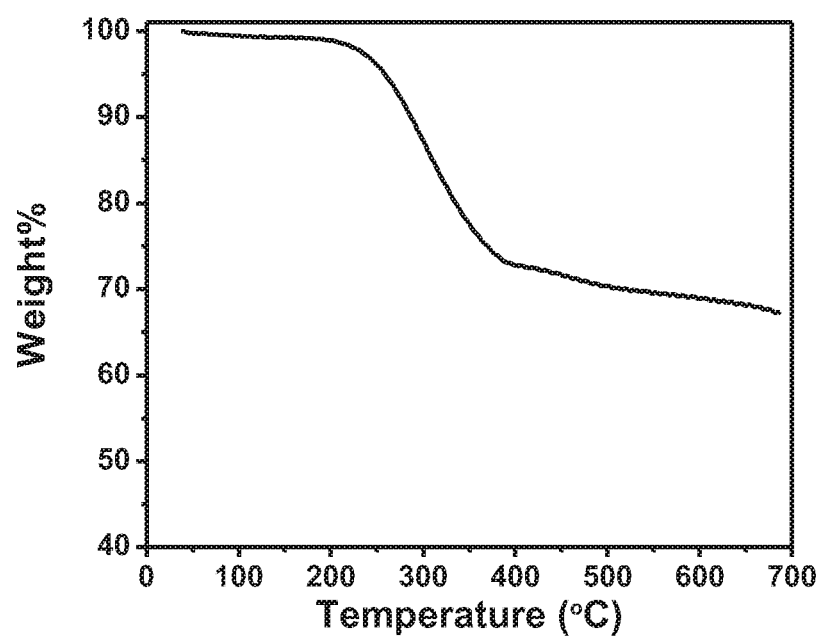
FIG. 6. Graph showing TGA trace for S/N-doped mesoporous carbon material admixed with carbon nanotube ("CNT-mesoporous carbon").

FIG. 6 shows the TGA curve for the CNT-mesoporous carbon material. The TGA curve in FIG. 6 shows that the sulfur content within the CNT-mesoporous carbon material after heat treatment at 300° C. was 33 wt %.

Composite Preparation and Electrode Assembly using CNT-Mesoporous Carbon Material The sulfur electrode was made by casting a well-homogenized slurry of CNT-mesoporous carbon material (65 wt %), carbon black (20 wt %), and PVdF (15 wt %) in NMP on aluminum foil using a doctor blade. The dried electrodes were pressed under a hydraulic load of 1 ton for 1 minute before cutting into discs of 1.3 cm diameter. The discs were further dried at 60° C. under vacuum for 24 hours before being transferred into a glovebox for battery assembly. The batteries were assembled as 2032-type coin cells inside an argon-filled glovebox by using the CNT-mesoporous carbon composite electrode as the cathode, lithium metal as the counter electrode, Celgard® 3401 as the separator, and either 0.5 M LiTFSI/MPPY.TFSI or 1.0M LiPF$_6$/methylisopropylsulfone (MiPS) as the electrolyte.

Cell Performance of CNT-Mesoporous Carbon Composite Electrode

FIGS. 7A, 7B show the charge/discharge profile (FIG. 7A) and cycle performance (FIG. 7B) of Li—S batteries based on CNT-mesoporous carbon composite electrodes in 1.0 M LiPF$_6$/MiPS whereas FIGS. 8A, 8B show charge/discharge profile (FIG. 8A) and cycle performance (FIG. 8B) of Li—S batteries based on CNT-mesoporous carbon composite electrodes in 0.5 M LiTFSI/MPPY.TFSI, at a current density of 84 mA g$^{-1}$ (20 wt % carbon) at room temperature. The composite electrode exhibited a reversible capacity of 1316 mAh g$^{-1}$ (second cycle) by using the electrolyte of 1 M LiPF$_6$/MiPS. After 50 cycles, the capacity was still maintained at 714 mAh g$^{-1}$. Using 0.5 M LiTFSI/MPPY.TFSI as electrolyte, the composite electrode delivered a reversible capacity of 1752 mAh g$^{-1}$ (second cycle), and after 50 cycles, the capacity was still maintained at 1126 mAh g$^{-1}$.

While there have been shown and described what are at present considered the preferred embodiments of the invention, those skilled in the art may make various changes and modifications which remain within the scope of the invention defined by the appended claims.

What is claimed is:

1. An electron-conducting porous composition comprising an organic polymer matrix having an ordered framework structure in which nitrogen atoms are interconnected by phenylene linkers, wherein said ordered framework structure contains micropores in which sulfur is incorporated, wherein said sulfur is incorporated in the micropores of said electron-conducting porous composition in an amount of at least 20% and up to 50% by weight of the electron-conducting porous composition.

2. The composition of claim 1, wherein the ordered framework structure is comprised of interconnected triphenylamine units.

3. The composite of claim 1, wherein the ordered framework structure possesses a surface area of at least 300 $m^2/g$.

4. The composite of claim 1, wherein the ordered framework structure possesses a surface area of at least 300 $m^2/g$ and up to 2500 $m^2/g$.

5. The composite of claim 1, wherein said sulfur is incorporated in the micropores of said electron-conducting porous composition in an amount of at least 30% and up to 50% by weight of the electron-conducting porous composition.

* * * * *